US011964377B2

(12) United States Patent
Hohl et al.

(10) Patent No.: US 11,964,377 B2
(45) Date of Patent: Apr. 23, 2024

(54) HINGE CONNECTION WHICH IS SEPARABLE FROM A LID OF A TOOL MANAGEMENT DEVICE AT A RECEIVING DEVICE FOR TOOL ELEMENTS

(71) Applicant: Würth International AG, Chur (CH)

(72) Inventors: Wolfgang Hohl, Amrichshausen (DE); Marcel Hopf, Crailsheim (DE); Johannes Starke, Flein (DE)

(73) Assignee: Würth International AG, Chur (CH)

( * ) Notice: Subject to any disclaimer, the term of this patent is extended or adjusted under 35 U.S.C. 154(b) by 102 days.

(21) Appl. No.: 17/248,270

(22) Filed: Jan. 15, 2021

(65) Prior Publication Data

US 2021/0245359 A1 Aug. 12, 2021

(30) Foreign Application Priority Data

Feb. 10, 2020 (DE) ........................ 102020103319.2

(51) Int. Cl.
*B25H 3/00* (2006.01)
*B25H 3/02* (2006.01)

(52) U.S. Cl.
CPC .............. *B25H 3/003* (2013.01); *B25H 3/02* (2013.01)

(58) Field of Classification Search
CPC ................................ B25H 3/003; B25H 3/02
USPC ........................................................ 206/379
See application file for complete search history.

(56) References Cited

U.S. PATENT DOCUMENTS 2,681,201 A * 6/1954 Grunwald ............. A01K 97/06 312/902
4,660,719 A 4/1987 Peterson et al.
5,332,305 A 7/1994 Slivon et al.
5,746,316 A * 5/1998 La Barre ............... B25H 3/003 206/443
5,826,718 A 10/1998 Ahern, Jr. et al.
6,283,291 B1 9/2001 Vasudeva et al.

(Continued)

FOREIGN PATENT DOCUMENTS

CN 1810461 A 8/2006
CN 201816053 U 5/2011

(Continued)

OTHER PUBLICATIONS

D'Andrea, A.; European Search Report in Application No. 20 215 565.1; pp. 1-5; Jul. 5, 2021; European Patent Office; 80298, Munich, Germany.

(Continued)

*Primary Examiner* — Robert J Hicks
*Assistant Examiner* — Sanjidul Islam
(74) *Attorney, Agent, or Firm* — Robert A. Blaha; Smith Tempel Blaha LLC

(57) ABSTRACT

A tool arrangement includes a tool management device with a body and a lid which, by a hinge connection, is configured pivotably relative to the body for selectively covering or releasing a receiving space of the body, and a receiving device for receiving tool elements. The receiving device is mounted or mountable in the receiving space of the body such that, by the hinge connection, the receiving device is co-pivoted when the lid is pivoted. The lid is detachable from the hinge connection, such that, after detaching the lid from the hinge connection, the receiving device is pivotable by actuating the hinge connection without the lid.

17 Claims, 10 Drawing Sheets

(56) References Cited

U.S. PATENT DOCUMENTS

| | | | | |
|---|---|---|---|---|
| 7,255,229 | B2 | 8/2007 | Roesler | |
| 2006/0169614 | A1* | 8/2006 | Roesler | B25H 3/003 206/379 |
| 2011/0139666 | A1 | 6/2011 | Sosnovsky et al. | |
| 2018/0222033 | A1 | 8/2018 | Livell | |

FOREIGN PATENT DOCUMENTS

| | | | |
|---|---|---|---|
| CN | 202878289 | U | 4/2013 |
| CN | 105328674 | A | 2/2016 |
| CN | 107249378 | A | 10/2017 |
| CN | 109877644 | A | 6/2019 |
| DE | 102005004253 | A1 | 8/2006 |
| EP | 0 199 080 | A2 | 10/1986 |
| EP | 1428633 | A1 | 6/2004 |
| TW | M271679 | U | 8/2005 |
| TW | M287210 | U | 2/2006 |
| TW | M325192 | U | 1/2008 |

OTHER PUBLICATIONS

Appelen, A; Communication Pursuant to Rule 71(3) EPC in Application No. 20215565.1, pp. 1-59; May 27, 2022; European Patent Office; Postbus 5818, 2280 HV Rijswijk, Netherlands.
German Patent and Trademark Office; Search Report in Application 10 2020 103 319.2; pp. 1-7; Apr. 25, 2022; Zweibrückenstraße 12, 80331, Munich, Germany.
First Office Action in Application No. 110104587; pp. 1-26; Sep. 14, 2021; Taiwan Intellectual Property Office; BF., No. 185, Sec. 2, Xinhai Rd., Da'an Dist., Taipei City 106213, Taiwan (R.O.C.).
English translation of First Office Action in Application No. 110104584; pp. 1-21; Sep. 14, 2021; Taiwan Intellectual Property Office; 3F., No. 185, Sec. 2, Xinhai Rd., Da'an Dist., Taipei City 106213, Taiwan (R.O.C.).

* cited by examiner

HINGE CONNECTION WHICH IS SEPARABLE FROM A LID OF A TOOL MANAGEMENT DEVICE AT A RECEIVING DEVICE FOR TOOL ELEMENTS

CROSS-REFERENCE TO RELATED APPLICATION

The present application claims the benefit of the filing date of German Patent Application No. 10 2020 103 319.2, filed 10 Feb. 2020, the disclosure of which is hereby incorporated herein by reference.

TECHNICAL FIELD

Embodiments of the invention relate to a tool arrangement and a method of managing tool elements by a tool arrangement.

TECHNOLOGICAL BACKGROUND

Drill boxes are known which are closable by a lid. When the lid is opened, a user may remove a drill from the drill box. Frequently, the drill boxes are stored in drawers. Usually, only one drill is removed from the drill box by a user for an application. For this purpose, the drawer has to be opened, the drill box has to be removed, the drill has to be selected and removed. After performing the application, the same steps have to be executed in reverse order to arrange the drill in the drill box again.

The elaborate handling of the drill boxes is disadvantageous.

SUMMARY

There may be a need to efficiently organize tool elements.

The subject matters with the features according to the independent patent claims are provided. Further embodiments are shown in the dependent claims.

According to an embodiment of the present invention, a tool arrangement with a tool management device with a body and a lid is provided, which lid is configured pivotably relative to the body by a hinge connection for selectively covering or releasing a receiving space of the body. The tool arrangement further comprises a receiving device for receiving tool elements which is mounted or mountable in the receiving space of the body such that, by the hinge connection, the receiving device is co-pivoted (mitgeschwenkt) when the lid is pivoted. The lid is configured detachably from the hinge connection so that, after detaching the lid from the hinge connection, the receiving device is pivotable by actuating the hinge connection without the lid.

According to a further embodiment of the present invention, a method of managing tool elements by a tool arrangement with the above-described features is provided, wherein the method comprises mounting the lid to the body and the hinge connection and subsequently selectively covering or releasing the receiving space of the body by pivoting the lid, whereby the receiving device is co-pivoted by the hinge connection. Alternatively or additionally, the method may comprise detaching the lid from the body and the hinge connection and subsequently pivoting the receiving device by actuating the hinge connection without the lid.

Overview of Embodiments

According to an embodiment of the present invention, a tool arrangement which is simply handable for pivotably receiving at least one receiving device for tool elements (such as drills) is provided which is utilizable also under constricted space conditions with low effort. In particular, a tool arrangement is provided where a lid of a tool management device is detachably coupled to a hinge connection. Another end of the hinge connection is coupled to a receiving device for receiving tool elements which is mounted in a receiving space of the tool management device. In this way, by pivotably opening the lid using the hinge connection, the receiving device may be co-pivoted, for example to an upright position. Thus, by a single hand motion, a user may pivot the lid with respect to the body for making the receiving device accessible, wherein the receiving device may automatically move to a removing position of the tool elements by this opening motion. Advantageously, the hinge connection for connecting the lid and the receiving device may be configured detachably at the side of the lid and separably from the lid, respectively. Therefore, it is possible to use the tool arrangement also without a lid and to insert it under constricted conditions, for example (for example in a drawer or in a case interior), where an insertion of the tool arrangement with the lid would make a completely pivoting upwardly of the lid for making the tool elements accessible difficult or impossible. Pivoting the receiving device to a removing orientation or equipping orientation may then be performed by a user actuating either directly the hinge connection or the receiving device. In this way, with a low constructive effort, a simple and intuitively handable tool arrangement may be provided which may be used selectively with or without the lid.

In the following, additional exemplary embodiments of the tool arrangement and the method are described.

According to an exemplary embodiment, the receiving device may be mounted or mountable in the receiving space such that, by the hinge connection, the receiving device is pivoted out of the receiving space, in particular pivoted to an upright position, when pivoting the lid for releasing the receiving space. Advantageously, by a single hand motion, the lid may be pivoted away from the body and thereby also the receiving device may be pivoted out of the receiving space. Thus, it is sufficient for a user to perform a single hand motion, in order to get access to tool elements and to tool element recesses of the receiving device, respectively.

According to an exemplary embodiment, the receiving device may be mounted or mountable in the receiving space such that, by the hinge connection, the receiving device is pivoted into the receiving space, in particular is pivoted to a lying position, when the lid is pivoted for covering the receiving space. By merely closing the lid, without the necessity for a user to perform a further action, the receiving device which previously was in a position which is accessible for a user, may be pivoted back in the receiving space. Thereby, a more simply handable tool arrangement is provided, wherein the receiving space may be efficiently used.

According to an exemplary embodiment, the receiving device may be mounted or mountable in the receiving space such that, when the lid is detached, the receiving device is pivotable by muscle strength of a user from a lying position to an upright position in a force-free state by a hinge connection. Advantageously, the receiving device may automatically pivot back to the lying state, when the muscle strength is discontinued. In such a configuration, when the lid of the tool arrangement is detached, a user has to bring the receiving device, which is lying without exerting the muscle strength, to an upright position to insert tool elements into the receiving device or to remove tool elements out of the receiving device. By merely releasing, the receiving device may then automatically pivot back into the receiving space. This enables an actuation of the tool arrangement by one hand and in a simple manner.

According to an exemplary embodiment, the hinge connection may be configured to be pivotably and detachably attached to the lid by a detachable connection mechanism at a hinge connection recess or mount at an inner side of the lid. For example, it is possible to accomplish a coupling between the hinge connection and the lid by clicking in or forming a latching connection at the lid. Therefore, it is possible for a user in a simple manner to selectively connect the hinge connection to the lid or disconnect the hinge connection from the lid.

The hinge connection may comprise a permanent or a likewise detachable connection to the receiving device. In case of a detachable connection, also at the side of the receiving device, it is possible for a user in a simple manner to equip a tool management device selectively with different receiving devices which nevertheless are pivotable by merely handling a lid.

According to an exemplary embodiment, the hinge connection may be configured to be pivotably and detachably attached to the lid by a connection mechanism at at least one hinge connection recess or mount at at least one side wall of the receiving device, in particular at two opposing hinge connection mounts or recesses at at least two opposing sidewalls of the receiving device. Descriptively, the hinge connection may laterally engage a receiving device in the receiving space and may thus exert a pivoting force on the receiving device at two positions. In contrast, the hinge connection may be coupled to a single central position at the lid. Thereby, it is sufficient to achieve a selective detaching of the lid from the hinge connection by releasing at only one position. At the same time, engaging on both sides of the receiving device leads to exerting symmetrical pivoting forces which suppress or even completely eliminate catching (Verhaken) or failure.

According to an exemplary embodiment, the hinge connection may be configured to remain attached to the receiving device when the lid is detached. In this way, a user may pivot a receiving device by grasping the, for example stirrup-shaped, hinge connection even when the lid of the tool arrangement is detached.

According to an exemplary embodiment, the hinge connection may be configured as a stirrup, in particular as a substantially C-shaped stirrup. A stirrup-like configuration of the hinge connection serves for a symmetrical and well-defined force transfer without the risk of undesired excessive bearing forces. Moreover, a stirrup-shaped hinge connection promotes a grasping of the hinge connection by a user in an anatomically advantageous configuration.

According to an exemplary embodiment, two opposing legs of the hinge connection which is formed as a stirrup may engage the two opposing sidewalls of the receiving device at an outer side, and a connection portion of the hinge connection which is configured as the stirrup, which connection portion is connecting the legs may engage at an inner side of the lid. This enables the handling of the tool arrangement with a low actuation force and additionally leads to lower bearing forces. A hinge connection which is realized with two legs and a connection portion may also be simply manufactured and works in operation in an error-free robust manner.

According to an exemplary embodiment, the tool arrangement may comprise a locking mechanism which is attached partially at the lid and partially at the body, which is configured for locking at the body, when the receiving space of the body is covered by the lid. Due to the possibility to lock the tool arrangement from the outside of the lid, it is possible to avoid an undesired falling out of tool elements from the tool arrangement also in mobile applications (for example in a vehicle or when transporting the tool arrangement by hand).

According to an exemplary embodiment, the locking mechanism may comprise an actuation unit for actuating the locking mechanism by a user at an outer surface of the lid. By means of a such configured actuation unit, a user may actuate the locking mechanism also without a tool.

According to an exemplary embodiment, the tool arrangement may comprise a further hinge connection at a pivoting axis between the body and the lid, which is configured for pivoting the lid relative to the body. By the further hinge connection between the lid and the body, the force transmission of a pivoting motion may be achieved in an error-free robust manner. Descriptively, the hinge connection between the lid and the receiving device and the further hinge connection between the lid and the body cooperate to form well-defined pivoting motions without excessive bearing forces. The hinge connection and the further hinge connection may comprise pivoting axes which are in parallel with respect to each other.

According to an exemplary embodiment, the receiving device may comprise a block-shaped, in particular ingot-shaped, base body, at least one tool element mount or recess which is formed at the base body for user-definedly receiving at least one tool element, and coupling structures which are formed at the base body, for coupling the receiving device with the tool management device. Such a block-shaped, in particular ingot-shaped, receiving device may be simply manufactured (for example, by injection molding) and enables in a compact configuration the receiving of multiple tool elements.

Coupling structures at the side of such a block or ingot may be configured for mounting to another receiving device or at the body. These coupling structures may be configured for pivotably bearing or for rigidly bearing the receiving device.

According to an exemplary embodiment, the coupling structures may be arranged at two opposing side surfaces of the base body. The symmetrical arrangement of the coupling structures at opposing side surfaces of the receiving device serves for a symmetrical transmission of force.

According to an exemplary embodiment, the coupling structures may be selectively configured for coupling the block with the tool management device and for decoupling the block from the tool management device. Therefore, a receiving device may be detachably attached to the body and may thus be replaced in a simple manner. In this way, a modular system is provided which may be configured by a user who wants to arrange particular tool elements in a manner tailored to his needs.

According to an exemplary embodiment, a serial arrangement of multiple tool element recesses or mounts may be formed at the base body. For example, at least two, in particular at least four, further in particular at least eight, tool element recesses, may be provided in a linear arrangement, to accommodate numerous tool elements in a block in a space-saving manner. A serial arrangement of multiple tool elements (for example bits or drills) serves for a compact accommodation also of numerous tool elements in the tool arrangement.

According to an exemplary embodiment, the at least one tool element recess may be configured for receiving at least one drill, in particular may comprise a circular inner profile.

A drill may be configured for use in a drilling machine as a tool which, by a rotating motion, holes may be formed in a rigid material. A drill usually has a cylindrical receiving body which may be inserted in a correspondingly formed and dimensioned tool element recess or coupler. Alternatively or additionally to drills, also other tool elements with a cylindrical receiving body may be received in cylindrical tool element recesses or mounts, for example a milling cutter. In this way, drills, milling cutters or other tool elements with a cylindrical shaft may be accommodated in the receiving device.

According to an exemplary embodiment, the at least one tool element recess may be configured for receiving at least one bit, in particular may comprise a hexagonal inner profile. "Bit" in particular may denote a replaceable screwdriver blade without a handle to engage a certain screw head profile. A receiving body of a bit for inserting into the tool element recess of the block may be shaped hexagonally, for example. The receiving body may be inserted into a correspondingly standardized bit holder.

According to an exemplary embodiment, the block may be configured integrally, in particular made of one material, in particular as an injection molded article. In this way, a simple and rapid manufacture of the block with a lightweight configuration is possible.

According to an exemplary embodiment, the tool arrangement may comprise at least one further receiving device for receiving tool elements which is mounted or mountable in the receiving space of the body at the receiving device, in particular by angle pieces at opposing sides of the receiving device. In particular, the at least one further receiving device may be, in particular exclusively, mounted at a side of the receiving device which is facing away from the lid, in particular without a hinge. In this way, it is possible to couple only one single receiving device with the hinge connection and to couple one or more further receiving devices to the receiving device which is pivotably mounted at the lid and the body, respectively, for example. The coupling between different receiving devices may be performed rigidly and non-pivotably, respectively. This leads to a mechanically simple configuration of the tool arrangement which nevertheless allows a free configuration and equipping of the tool management device by a user with one or more freely combinable receiving devices. When pivoting the receiving device inwardly, which is pivotably mounted at the hinge connection and the body, respectively, also the further receiving devices, which are rigidly coupled to it, are pivoting into the receiving space of the body and may thus be accommodated in a space-saving manner. In summary, this leads to a compact and mechanically simple configuration of the tool arrangement.

According to an exemplary embodiment, the receiving device may comprise first tool elements (in particular drills of a first size) and the further receiving device may comprise second tool elements (in particular further drills of a second size), wherein the first tool elements may have a larger length than the second tool elements. For example, the different receiving devices of the tool arrangement may receive tool elements with different dimensions which may be pivoted out of the receiving space by pivoting the receiving device which is hingeably attached to the lid out of the receiving space, to be made accessible with a handle for a user.

According to an exemplary embodiment, the at least one further receiving device may comprise a block-shaped, in particular ingot-shaped, base body, at least one tool element recess or mount which is formed at the base body for user-definedly receiving at least one tool element, and coupling structures which are formed at the base body for coupling the at least one further receiving device with the above-described receiving device. In other words, also the one or the multiple further receiving devices may be configured block-shaped or ingot-shaped, as described above. It is possible that the receiving device on the one hand and the other receiving device on the other hand receive different tool element types (the receiving device may receive drills and the further receiving device may receive bits, for example).

According to an exemplary embodiment, the body may comprise a bottom and four sidewalls. For example, the four sidewalls may extend substantially vertically starting from the substantially planar bottom, to delimit a large receiving space in which the receiving devices and the tool elements are protected against falling out.

According to an exemplary embodiment, the tool management device may be configured such that, when the lid is pivoted relative to the body around a predetermined angle, the lid is transferable to a latching position in which the receiving device, by means of the hinge connection, is transferred to an access position (in particular an upright position) for accessing the at least one tool element at the receiving device by a user. Advantageously, when pivoting the lid around a predetermined angle, the lid may automatically latch and thereby mechanically prevent a further pivoting to larger angles. In this way, an undesired overstretching of the hinge connection which may be accompanied by an excessively large pivoting angle may be reliably prevented. Thereby, the hinge connection which is configured as a plastic stirrup, for example, may be protected against damage or malfunction. The pivoting angle of the lid relative to the body where the latching occurs may preferably be between 90° and 130°, for example approximately 110°. Thereby, a stirrup-shaped hinge connection may be efficiently protected from an overstretching and it may nevertheless be ensured that a user may conveniently get access to the entire receiving space.

According to an exemplary embodiment, the tool management device may be configured to be form-lockingly stackable with a similar or identical tool management device. "Identical tool management device" denotes such a one which, with respect to shape and dimension, is identical to said tool management device. "Similar tool management device" denotes such a one whose shape or design corresponds to that of said tool management device, but which may comprise other dimensions at least in portions, for example. Structures for stacking tool management devices at similar tool management devices may be advantageously configured in such a manner that they may be used with each other in a corresponding manner.

According to an exemplary embodiment, for stacking, a bottom of the body may comprise outer (preferably rectangular) feet for engaging in and/or around corresponding profiles (preferably rectangular indentations) at an outer side of the lid. A form-locking connection of feet at the lower side of the bottom with corresponding indentations or any other profile at a top side of the lid enables a simple and intuitive stacking of the tool arrangement without the risk of shifting or detaching. For example, this may be advantageous for mobile applications, for example in a vehicle.

Alternatively or preferably additionally, for stacking, the tool arrangement may comprise an at least partially surrounding bar at a bottom of the body at an inner side for engaging in at least one partially surrounding indentation in an inner region of the lid. In this way, also in an inner region of the body and the lid, a stackable system of corresponding structures may be formed. This enables in particular the stacking of similar, but not identical tool arrangements, such as tool arrangements with different sizes. These may nevertheless comprise corresponding or complementary stacking structures for stacking in an inner region of the body and the lid.

According to an exemplary embodiment, the method may comprise, after detaching the lid, accommodating the body and the receiving device which is mounted to it under constricted space conditions, in particular in a drawer or in a case. “Constricted space conditions” in particular denotes space conditions in which a pivoting of the lid of the tool arrangement is prevented to such an extent as it is necessary for an unrestricted access for a user to the tool elements which are located in the at least one receiving device. In particular, the method may comprise, after accommodating the tool arrangement without the lid, a pivoting of the receiving device and a removing of a tool element from the receiving device without removing the body and the receiving device which is mounted to it from the drawer or from the case, or any other constricted space conditions. When the lid is separated from the body and the receiving device, the tool arrangement may be actuated without the lid under constricted spatial conditions, such as in a case or in a drawer, without the need to first completely take out the tool arrangement from the drawer or the like prior to pivoting out the receiving device. Instead, the tool arrangement without the lid may remain in the drawer or in any other constricted environment, such that a user may directly accomplish pivoting out the receiving device by hand, to get access to the tool elements and the tool element recesses of the receiving device, respectively. A management and a use also of a complex set of tool elements is then possible for a user in a simple and rapid manner.

According to an exemplary embodiment, the method may comprise, subsequently to detaching the lid, manually actuating the hinge connection by a user. When the hinge connection is configured as a stirrup, for example, a user may grasp this stirrup-shaped hinge connection in a simple manner, in order to pivot the receiving device without the lid.

In particular, the method may comprise user-definedly receiving at least one tool element at at least one tool element recess or mount which is formed at the receiving device, and coupling the receiving device with the tool management device by forming an operative connection between coupling structures which are formed at the receiving device and further coupling structures of the tool management device. According to an exemplary embodiment, the method may comprise equipping and/or re-equipping the receiving device by a user with a set of user-defined tool elements which is selected from a larger reservoir of tool elements by a user. According to such embodiments of the invention, a freely combinable modular system is provided. In other words, the hinge connection (for example by a stirrup-shaped configuration) may be shaped such that a user may grasp it in an anatomically simple manner, in order to be able to pivot the receiving device out of the receiving space of the body in a simple manner, also when the lid is removed or demounted. Descriptively, a user may equip a desired receiving device of a set of receiving devices with a desired arrangement of a larger set of tool elements and may flexibly equip the receiving space of the receiving arrangement with it. Thereby, a flexibly configurable system is provided which may be tailored by a user to his individual requirements.

According to an exemplary embodiment, the method may comprise equipping and/or re-equipping the tool management device by a user with a set of user-defined receiving devices which is selected from a larger reservoir of receiving devices by a user. Also, multiple types of receiving devices (for example a drill box, a bit box or a bit holder box) may form a part of an assembly which may be variably combined by a user, to adapt it to a respectively desired set of tool elements.

For example, a block according to an embodiment of the invention which is configured as a bit block may comprise a hexagonal recess or mount for one or more bits. A block which is configured as a drill block may comprise a cylindrical recess. In other words, a tool element recess and the tool elements may be adapted to each other with respect to shape and dimension.

According to an exemplary embodiment, the hinge connection may comprise at least one pin and the lid may comprise at least one slide guide for guiding the at least one pin along a pregiven or predetermined trajectory and along a defined or pregiven path, respectively. Advantageously, the hinge connection may comprise at least one pin and the lid may comprise at least one slide guide for guiding the at least one pin along a predetermined way line. In this way, the tool management device which is configured with a pivotable lid and the receiving device for tool elements which is, preferably also in a pivotable manner, arranged in the tool management device, may be operatively coupled in a mechanically error-free and robust manner. A pivoting motion of the lid relative to the body may be accomplished in a precisely guided manner, wherein advantageously the receiving device may be co-moved during the pivoting motion. The latter is additionally promoted by the fact that the cooperation of slide guide and the pin specifies a pivoting trajectory in a well-defined manner. Due to the hinge connection, the receiving device may be co-pivoted when the lid is pivoting with respect to the body, and thereby may expose tool elements which are received therein for a user. A protected re-accommodating of the tool elements in the body is enabled by simply pivoting back the lid with respect to the body. The reciprocating motion of the pivoting may be definedly predetermined by the system made of the slide guide and pin. Thereby, maloperations may be avoided and a vulnerability of the tool management device for damage may be effectively suppressed.

According to an exemplary embodiment, the pregiven or predetermined trajectory may be pregiven or defined by a (for example straight) guiding channel in the at least one slide guide. The pin may move along the guiding channel. Such a configuration is mechanically especially simple and compactly realizable and promotes a motion with low friction of the pin or the pins in the guiding channel or the guiding channels.

According to an exemplary embodiment, alternatively to guiding in the at least one slide guide at the at least one slide guide, at least one latching unit may be formed, to which the at least one pin is latchable. Providing a latching unit at the slide guide enables the hardware-related adjustment of an alternative operational mode of the tool arrangement in which a fixed folding angle is provided or pregiven. The pin rotates at a fixed position in the latching unit, when the lid is pivoted with respect to the body. In this embodiment, the folding angle may be defined by the fact that the pin is latched at a corresponding position of the latching unit and may indeed be rotated there, but cannot be translationally displaced.

According to an exemplary embodiment, the hinge connection (in particular a stirrup of the hinge connection) may be configured deformably, such that the at least one pin of the hinge connection is changeably re-mountable by a user between the slide guide and at least one latching unit at the slide guide. A first mounting position may correspond to a fixed folding angle between the lid and the body which may be enabled by firmly latching a respective pin in a latching unit of the lid, for example. In a second mounting position of the hinge connection, the pin may be displaceably mounted in a guiding channel of the slide guide. By softly and elastically, respectively, forming the material of the hinge connection, it may be possible for a user, by bending and temporarily deforming the hinge connection and its stirrup, respectively, to freely select between the configuration with the fixed folding angle and the configuration with the variable folding angle.

In the following, exemplary embodiments of the present invention are described in detail with reference to the following figures.

DETAILED DESCRIPTION OF EXEMPLARY EMBODIMENTS

Same or similar components in different figures are provided with the same reference numbers.

Before, referring to the figures, exemplary embodiments of the invention are described and some general aspects of the embodiments of the invention are explained.

According to an exemplary embodiment, a tool arrangement is provided which may receive drills or other tool elements in a system box in a simply handable manner. A lid of a tool management device of the tool arrangement comprises a hinge connection to a receiving device for tool elements (in particular a drill holder), in order to pivot it. According to a preferred embodiment, the lid may be separated from the body and the hinge, such that a user may arrange the tool management device (in particular configured as a drill box) without the lid in a drawer or under other constricted space conditions (for example in a case). For removing a drill or another tool element, the tool arrangement may be left in the drawer. A user may directly grasp the hinge connection, pivot a receiver or holder and remove a drill or another tool element. The tool arrangement does not have to be completely removed from the drawer. This enables a simpler handling of the drill box and removal of the drills compared to conventional approaches.

In an embodiment of the invention, a receiving device for tool elements (in particular a drill holder, further in particular a drill ingot) is arranged in a tool management device which is configured as a case. An end of the hinge connection may be arranged at the receiving device and another end of the hinge connection at a lid of the case. When the lid is opened, preferably more than 90°, and brought into a latching position (for example at approximately 110°), the receiving device which is configured as a drill ingot, for example, is pivoted to an upright position and a drill or another tool element may be removed. When the lid is closed again, the receiving device is again pivoted to a position in parallel with respect to the bottom of the body.

Figure 1A:
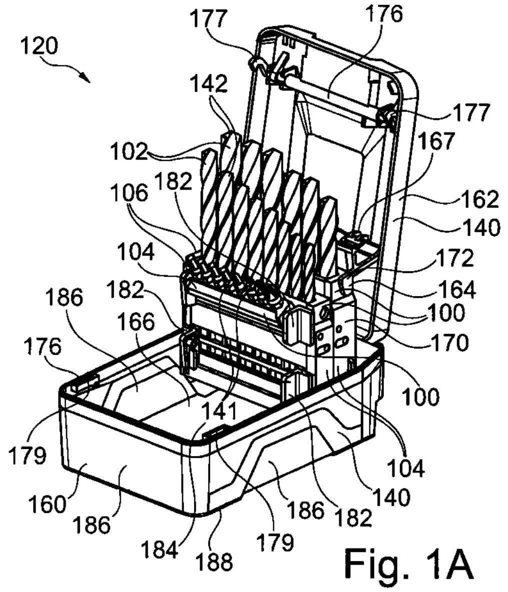
FIG. 1A shows a three-dimensional view of a tool arrangement according to an exemplary embodiment of the invention when the lid is opened.
Figure 1B:
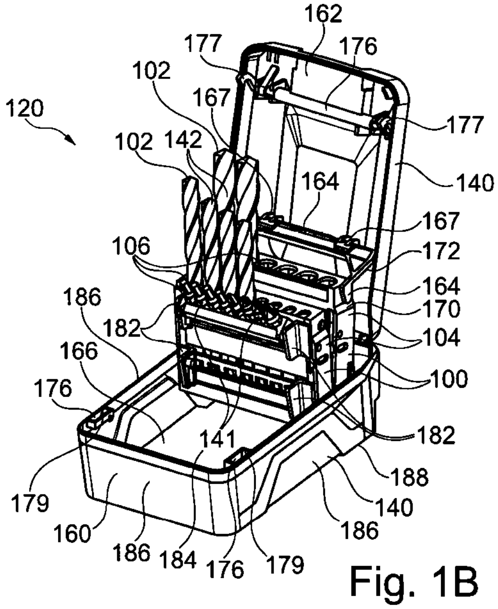
FIG. 1B shows another three-dimensional view of the tool arrangement according to FIG. 1A when the lid is opened.
Figure 2:
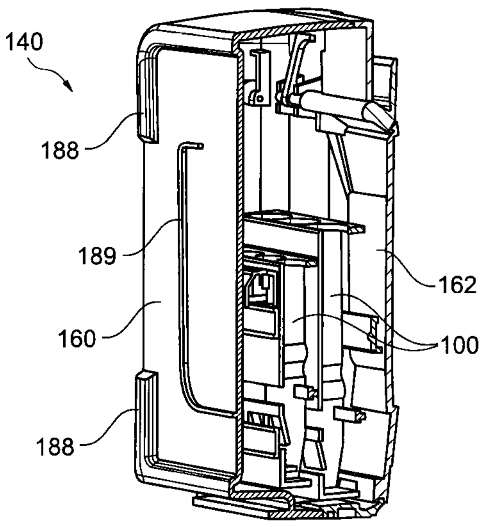
FIG. 2 shows a three-dimensional cross-sectional view of the tool arrangement according to FIG. 1A and FIG. 1B when the lid is closed.
Figure 3A:
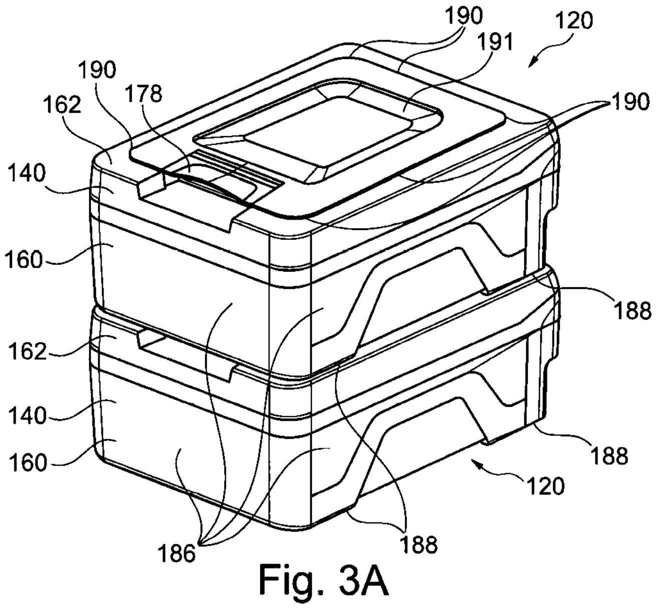
FIG. 3A shows a three-dimensional view of two tool arrangements according to FIG. 1A and FIG. 1B which are stacked on each other.
Figure 3B:
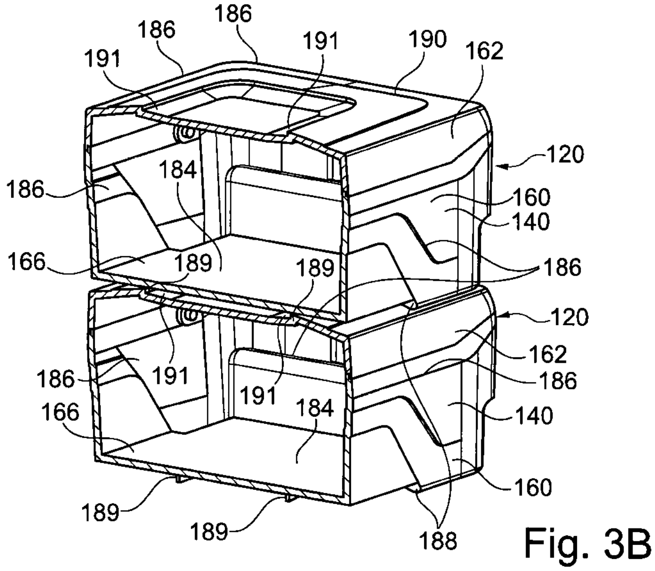
FIG. 3B shows a three-dimensional cross-sectional view of the two tool arrangements which are stacked on each other according to FIG. 3A.

FIG. 1A shows a three-dimensional view of a tool arrangement 120 according to an exemplary embodiment of the invention. FIG. 1B shows another three-dimensional view of the tool arrangement 120 according to FIG. 1A. According to FIG. 1A and according to FIG. 1B, a lid 162 is pivoted up with respect to a body 160 under release of a receiving space 166. FIG. 2 shows a three-dimensional cross-sectional view of the tool arrangement 120 according to FIG. 1A and FIG. 1B when the lid 162 is closed. FIG. 3A shows a three-dimensional view of two tool arrangements 120 according to FIG. 1A and FIG. 1B with the respective tool arrangements stacked on each other. FIG. 3B shows a three-dimensional cross-sectional view of the two tool arrangements 120 according to FIG. 3A which are stacked on each other.

The tool arrangement 120 comprises a tool management device 140 which is configured as a box with a body 160 and a lid 162. The lid 162, by the hinge connection 164, is configured pivotably relatively to the body 160 for selectively covering or releasing the receiving space 166 of the body 160.

The tool arrangement 120 further comprises a receiving device 100 which is configured as drill box here for receiving tool elements 102 which are detachably mounted in the receiving space 166 of the body 160. The tool elements 102 may be received at the receiving device 100 by being plugged into corresponding receiving hollows as tool element recesses 106 by a user. The receiving device 100 is mounted or mountable in the receiving space 166 of the body 160, such that, by the hinge connection 164, the receiving device 100 is co-pivoted when the lid 162 is pivoted.

Advantageously, the lid 162 may be detachably configured from the body 160 and the hinge connection 164. Thereby, it is possible that, after detaching the lid 162 from the rest of the tool arrangement 120 and after releasing the connection between the lid 162 and the hinge connection 164, the receiving device 100 is pivotable by actuating the hinge connection 164 with respect to the body 160 without the lid 162.

Furthermore, when the lid 162 is coupled to the body 160 and to the hinge connection 164, the receiving device 100 may be mounted or mountable in the receiving space 166 which is delimited by the body 160, such that, by the hinge connection 164, the receiving device 100 is pivoted out of the receiving space 166, when the lid 162 is pivoted out of the receiving space 166. Advantageously, the receiving device 100 may be pivoted to an upright position. Furthermore, the receiving device 100 may be mounted or mountable in the receiving space 166, such that, by the hinge connection 164, the receiving device 100 is pivoted in the receiving space 166, when the lid 162 is pivoted for covering the receiving space 166. Thereby, the receiving device 100 may be pivoted to a lying position, in which the receiving device 100 is accommodated in the receiving space 166 in a space-saving manner.

Moreover, the receiving device 100 may be mounted or mountable in the receiving space 166, such that, when the lid 162 is detached, the receiving device 100 is pivotable from a lying position to an upright position in a force-free state by the hinge connection 164 by the muscle strength of a user. For example, the receiving device 100 may automatically pivot back to the lying state, when the muscle strength is discontinued.

Figure 6:
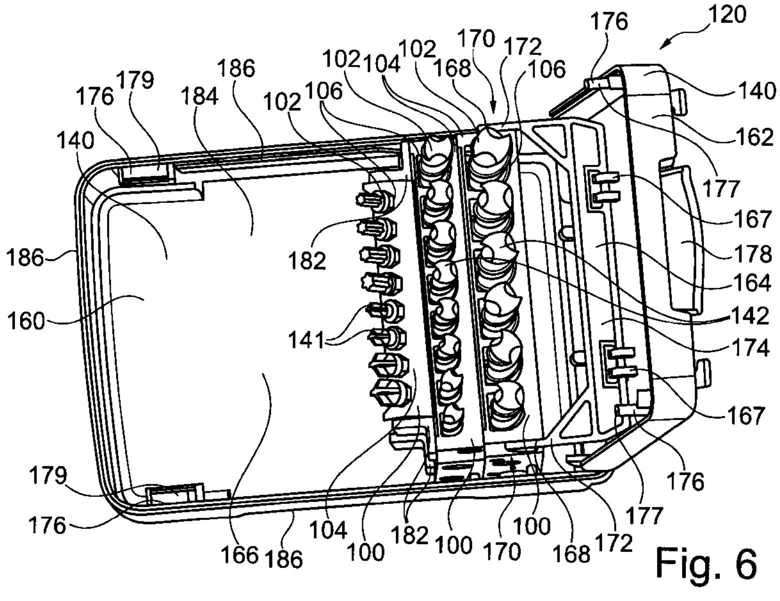
FIG. 6 shows a three-dimensional view of the tool arrangement according to FIG. 4 and FIG. 5 above.
Figure 8:
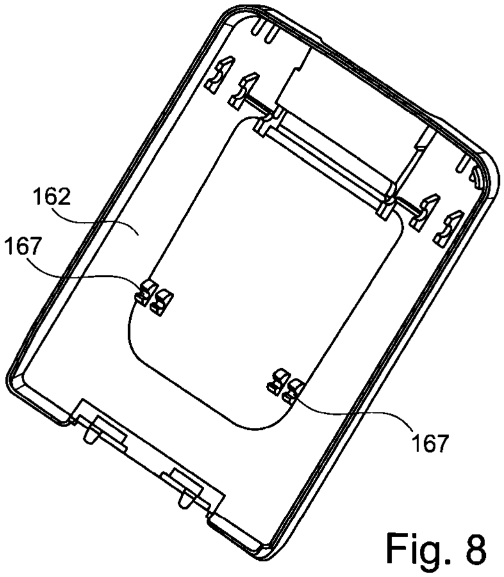
FIG. 8 shows a three-dimensional view of the lid of the tool arrangement according to FIG. 4 to FIG. 7.

Advantageously, the hinge connection 164 may be configured to be pivotably and detachably attached to the lid 162 by a detachable connection mechanism at a hinge connection recess 167 which is illustrated in FIG. 6 and FIG. 8. The hinge connection 164 may be further configured to be pivotably and detachably attached to the lid 162 by a connection mechanism at two opposing hinge connection recesses 168 at two opposing sidewalls 170 of the receiving device 100. This can be seen in FIG. 1B and is even more evident in FIG. 6 and FIG. 9. Moreover, the hinge connection 164 may be configured to remain attached to the receiving device 100 when being removed from the lid 162 (compare FIG. 9).

As illustrated in FIG. 1B (and in FIG. 6 and FIG. 9), the hinge connection 164 may be configured as a substantially C-shaped stirrup. Two opposing legs 172 of the hinge connection 164 which is configured as a stirrup engage at the two opposing sidewalls 170 of the receiving device 100 at an outer side. A connection portion 174 of the hinge connection 164 which is configured as the stirrup, which connection portion 174 is connecting the legs 172, engages at the inner side of the lid 162, in more detail at a hinge connection recess 167 at an inner side of the lid 162.

Furthermore, partially at the lid 162 and partially at the body 160, a locking mechanism 176 is attached which can be seen in FIG. 1A and FIG. 1B. The locking mechanism 176 serves for locking the lid 162 at the body 160, when the receiving space 166 of the body 160 is covered by the lid 162. For this purpose, the locking mechanism 176 comprises an actuation unit 178 for actuating the locking mechanism 176 at an outer surface of the lid 162 by a user. By actuating the actuation unit 178, a pivoting bolt may be lockingly inserted into a bolt recess 179.

Figure 4:
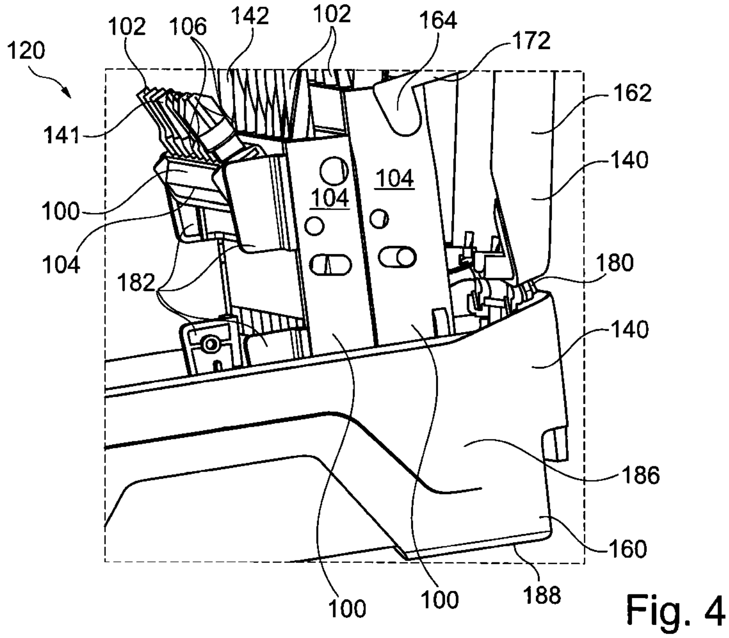
FIG. 4 shows a detail of a tool arrangement according to an exemplary embodiment of the invention.
Figure 9:
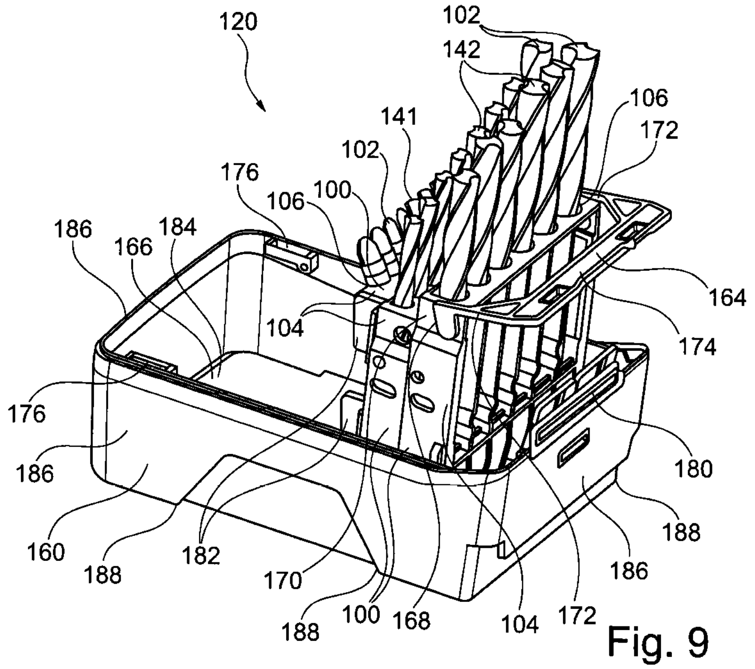
FIG. 9 shows a three-dimensional view of the tool arrangement according to FIG. 4 to FIG. 8 from a side.

Moreover, the tool arrangement 120 comprises a further hinge connection 180 at a pivoting axis between the body 160 and the lid 162 (see FIG. 4 and FIG. 9). The further hinge connection 180 is configured for promoting the pivoting of the lid 162 relative to the body 160.

In the following, the receiving device 100 which is connected with the hinge connection 164 is described in more detail. In the illustrated embodiment, this receiving device 100 is a block-shaped base body 104 which may have approximately the shape and the size of a cigarette packet, for example. As shown in FIG. 1B, for example, multiple serially arranged tool element recesses 106 for user-definedly receiving tool elements 102, in the illustrated example drills, are provided at the base body 104. A respective tool element recess 106 may be configured for receiving at least one drill 142 and may comprise a circular inner profile for this purpose. Each of the tool element recesses 106 may be equipped with a drill 142.

Moreover, at the base body 104, coupling structures (see reference sign 108 in FIG. 10) for coupling the receiving device 100 with the tool management device 140 are formed. Said coupling structures 108 are arranged at two opposing side surfaces 170 of the base body 104. The coupling structures 108 selectively serve for coupling the receiving device 100 which is configured as a block with the tool management device 140 and for decoupling the receiving device 100 from the tool management device 140. Advantageously, the receiving device 100 may be configured integrally and made of one material, especially preferred as injection molded article.

As shown, at the tool arrangement 120, one or more further receiving devices 100 for receiving tool elements 102 may be provided. These may be mounted or mountable to the receiving space 166 of the body 160 at the receiving device 100. This mounting may be advantageously accomplished by angle pieces 182 at opposing sides of a respective one of the receiving devices 100.

The further receiving devices 100 may be mounted exclusively at a side of the pivotable receiving device 100 which is facing away from the lid 162, for example. Besides, the further receiving devices 100 may be coupled at the only pivotable receiving device 100 in a hinge-free and rigid manner. In the illustrated embodiment, the pivotable receiving device 100 accommodates first tool elements 102 and the other receiving device 100 which is rigidly attached to it accommodates second tool elements. For example, the first tool elements 102 (for example longer drills) may have a larger length than the second tool elements 102 (for example shorter drills).

The body 160 of the tool management device 140 may comprise a bottom 184 and four sidewalls 186 which are integrally connected with the bottom 184 to thereby delimit the receiving space 166.

Although not shown, the tool management device 140 may be advantageously configured such that, when the lid 162 is pivoted relatively to the body 160 to a pre-defined angle, the lid 162 is transferable to a latching position. In this position, the receiving device 100 may be transferred in an upright position by the hinge connection 164, as it is the case in FIG. 1A and FIG. 1B, for example. Since a further opening of the lid 162 is mechanically made impossible by the latching position, an excessive stretching of the hinge connection 164 by an excessively large opening angle may be advantageously avoided.

As can be taken from FIG. 3A and FIG. 3B, it is advantageously possible to form-lockingly stack the tool management device 140 with a similar or identical tool management device 140. For stacking, a bottom of the body 160 may comprise feet 188 at an outer side for engaging complementary profiles 190 at an outer side of the lid 162. Furthermore, for stacking tool management devices 140, it is advantageous to equip a bottom of the body at an inner side with a bar which, according to FIG. 2A, is partially surrounding, for example (i.e., a ring-bar which is interrupted in this case), which is configured for engaging into a surrounding indentation 191 in an inner region of the lid 162.

In operation, the lid 162 may be detached from the body 160 and the hinge connection 164. Subsequently, the receiving device 100 may be pivoted by manually actuating the hinge connection 164 without the lid 162. After detaching the lid 162, the receiving devices 100 which are directly and indirectly, respectively, mounted to the body 160, may be pivoted under constricted space conditions relatively to the body 160, for example in a drawer or in a case. After accommodating, a pivoting of the receiving device 100 and removal of a tool element 102 from the receiving device 100 may be performed without removing the body 160 and the receiving devices 100 which are mounted to it from the drawer or from the case.

Advantageously, a user-definedly receiving of tool elements 102 at the tool element recesses 106 which are formed at the receiving devices 100 is possible. Furthermore, the receiving devices 100 may be arbitrarily replaced in the tool management device 140. Moreover, equipping and/or re-equipping the receiving devices 100 by a user with a set of user-defined tool elements 102 is enabled which may be selected by a user from a larger reservoir of tool elements 102. Also equipping and/or re-equipping the tool management device 140 with a set of user-defined receiving devices 100 may be performed. The set may be selected from a larger reservoir of receiving devices 100 by a user.

FIG. 1A and FIG. 1B thus show a drill box with the body 160 with the bottom 184 and four sidewalls 186, wherein the body 160 is selectively closable by the lid 162. In the body 160, a holder for drills as receiving device 100 is pivotably mounted, wherein the drill holder which may also be present in the form of one or more drill ingots is mechanically connected to the lid 162 via the hinge connection 164. In this way, the drill holder may be pivoted in an upright position, when the lid 162 is opened. In the present case, the hinge connection 164 is formed by a C-shaped stirrup, whose free end is pivotably coupled to the drill holder and whose other free end is pivotably coupled to the lid 162.

Advantageously, the lid 162 may be separated from the body 160, wherein the hinge connection 164 remains at the drill holder, i.e., the pivotably mounted receiving device 100.

When the drill box is arranged in a drawer without the lid 162, for example in a tool inlay, the drawer may be opened. Then a user may directly grasp at the hinge connection 164 of the drill holder to move the drill holder to an upright position for removing a drill 142. When the drill 142 is removed, the hinge connection 164 may be released by the user, whereby the holder automatically falls back into the receiving space 166 of the body 160. In this way, it may be advantageously omitted to remove the body 160 from the drawer for removing the drill 142.

The receiving devices 100 which are configured as drill holders of the tool arrangement 120 according to FIG. 1A and FIG. 1B encompass two drill ingots which are stacked on each other. In the front drill ingot, the short drills 142 are arranged and in the back drill ingot, the longer drills 142 are arranged. By receiving structures (see reference sign 108 in FIG. 10), the drill ingots are plugged on pins (see receiving structures 109 in FIG. 7) in the both sidewalls of the body 160 and are thereby pivotable in the body 160. On the front side of the front drill ingot, at the top, two angle pieces 182 which are opposing in the lateral direction are plugged, between which a bit ingot as the further receiving device 100 is arranged (further below in FIG. 1A and FIG. 1B, also two angle pieces 182 are provided, but are not equipped with a bit ingot in the illustrated form). The tool elements 102 which are received in the bit ingot are configured as bits and are designated by the reference sign 141.

By the described configuration, the drills 142 in the receiving devices 100 which are configured as drill ingots and the bits 141 in the receiving device 100 which is configured as a bit ingot, respectively, and the receiving device 100 may be actually replaced in the tool management device 140 in a simple manner. This enables a simple exchange of a concrete drill by a wood drill, for example, by a replacement of a drill ingot. Of course, this also applies for the bit ingots and the bits 141 in the bit ingot. From a stock, drills 142, drill ingots, bits 141 and bit ingots may be combined in the drill box for the respective purpose of use and may then be transported in a case to the construction site at the location of use.

Instead of a drawer, the body 160 with the receiving device(s) 100, in particular drill ingots, may also be arranged in a case or the like (i.e., drill box without lid 162 in the case), to then pivot the drill holder in the body 160 in the case by the hinge connection 164 in an upright position and back.

Furthermore, if necessary, a latching of the lid 162 with the body 160 by the latching mechanism 176 (compare FIG. 2) is performed. The drill box comprises a component of the latching mechanism 176 at the lid 162, to latch the lid 162 with the body 160. Advantageously, the latching may be released by one or two fingers and at the same time the actuation unit 178 of the latching and/or the lid 162 may be grasped, such that the lid 162 may be unlatched and opened by one hand. Thus, one hand is sufficient to unlatch the lid 162 and to subsequently open the lid 162.

Furthermore, according to an embodiment of the invention, a stacking of bit boxes is possible, see FIG. 3A and FIG. 3B. The body 160 comprises at an outer side four feet 188 at the bottom which are engaging in or around profiles 190 in the lid 162 of a drill box which is arranged below. In this way, multiple drill boxes may be stacked.

Preferably, a bar 189 (configured as a rectangle, for example) protrudes from the bottom of the drill box as a further foot (FIG. 3A and FIG. 3B) which fits in a surrounding indentation 191 (for example a rectangular indentation as further foot recess) in the lid 162 of another drill box. In this way, drill boxes may be stacked also when they have different sizes. In particular, a set of drill boxes with different sizes may be provided.

Thus, in the configuration according to FIG. 1A and FIG. 1B, the lid 162 is configured detachably from the body 160 and from the receiving device 100 or the receiving devices

100. When detaching the lid 162, the hinge connection 164 remains at the receiving device 100 which is configured as a drill ingot according to FIG. 1A and FIG. 1B. To said receiving device 100, two further receiving devices 100 are attached. These further receiving devices 100 which are rigidly attached to said receiving device 100 are configured as a further drill ingot and a bit ingot which is attached to the further drill ingot in the illustrated embodiment. Said receiving device 100 is configured pivotably with respect to the body 160, which is promoted by the hinge connection 164 in the mounted state of the lid 162. The pivotable receiving device 100, by coupling structures 108 at opposing sidewalls 170, is pivotably mounted with corresponding coupling structures 109 at inner surfaces of the sidewalls 186 of the body 160. Due to the hinge connection 164, pivoting the lid 162 serves for co-pivoting the pivotably mounted receiving device 100 and the further receiving devices 100 which are rigidly coupled to it. The, in the shown embodiment three, receiving devices 100 which are rigidly connected to each other, due to the described common pivoting motion, may be accommodated together in the receiving space 166 or may be pivoted out to a handling position which is accessible for a user according to FIG. 1A.

When the lid 162 is detached, the body 160 and the hinge connection 164, including one or more receiving devices 100 with the tool elements 102 which are attached to it, may be accommodated in a drawer or in other similar constricted spatial conditions. The receiving devices 100 may be brought in an upright position in the interior of the body 160 and in the interior of the drawer by directly handling the hinge connection 164 by a user. Thus, it is not necessary to remove the tool arrangement 120 as a whole from the drawer to get access to the receiving devices 100 and the tool elements 102 which are optionally received therein. This significantly simplifies the handling.

Thus, a user may equip the body 160 in a freely selectable manner with one or more receiving devices 100. One of these receiving devices 100 is pivotably mounted to the body 160 by corresponding coupling structures 108. One or more further receiving devices 100 may be rigidly attached to the pivotably mounted receiving device 100 in a freely selectable manner. The receiving devices 100 may be selected such that tool elements (such as drills 142, bits 141, milling cutters, etc.) may be received by it which are required by a user for a certain mounting task. A such equipped tool arrangement 120 may be inserted selectively with the lid 162 (for example for carrying in a vehicle, protected against falling out) or without the lid 162 (for example under constricted conditions, such as in a case or in a drawer for pivoting out the receiving devices 100 without removing from the case or the drawer). Due to the detachable connections of the hinge connection 164 and the coupling structures 108, 109, a customizable configuring and re-configuring of the tool arrangement 120 is enabled.

Figure 5:
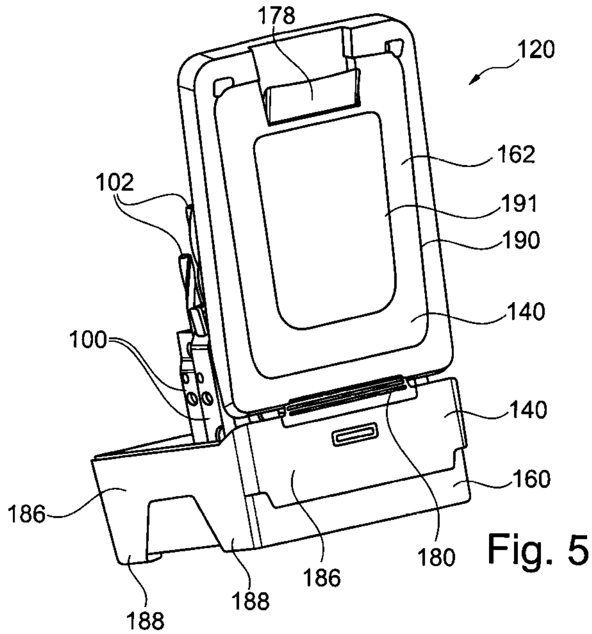
FIG. 5 shows a three-dimensional view of the tool arrangement according to FIG. 4 in a folded-up state of a lid.
Figure 7:
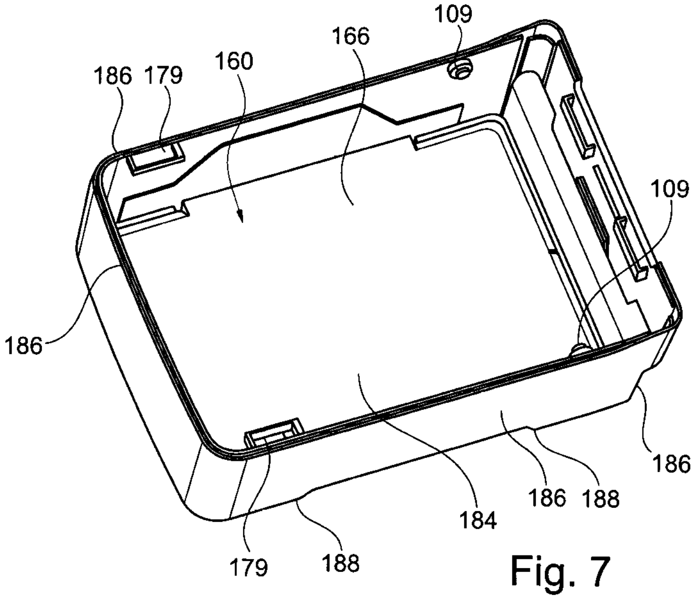
FIG. 7 shows a three-dimensional view of the body of the tool arrangement according to FIG. 4 to FIG. 6.

FIG. 4 shows a detail of a tool arrangement 120 according to an exemplary embodiment of the invention. FIG. 5 shows a three-dimensional view of the tool arrangement 120 according to FIG. 4 in an unfolded state of a lid 162 which is depicted from above. FIG. 6 shows a three-dimensional view of the tool arrangement 120 according to FIG. 4 and FIG. 5 from above. FIG. 7 shows a three-dimensional view of a body 160 of the tool arrangement 120 according to FIG. 4 to FIG. 6. FIG. 8 shows a three-dimensional view of the lid 162 of the tool arrangement 120 according to FIG. 4 to FIG. 7. FIG. 9 shows a three-dimensional view of the tool arrangement 120 according to FIG. 5 to FIG. 8 from the side.

The detail according to FIG. 4 shows how the receiving device 100 which is configured as a bit ingot is rigidly attached to the central receiving device 100 which is configured as a drill box by the angle pieces 182. This central receiving device 100 in turn is arranged at the only directly pivotably mounted receiving device 100 on the right-hand side in FIG. 4 which is pivotably mounted in the receiving space 166 by the hinge connection 164. In the upright position according to FIG. 4, a user conveniently has access to the tool elements 102 which are received in the receiving device 100.

FIG. 5 in particular shows the further hinge connection 180 between the body 160 and the lid 162 as well as the actuation unit 178 of the locking unit 176 which is attached to an outer side of the lid 162. One single hand movement is sufficient for a user to be able to unlock the actuation unit 176 and to pivot the lid 162 with respect to the body 160, in order to get access to the receiving space 166.

In FIG. 6, the stirrup-shaped configuration of the hinge connection 164 is clearly visible.

The illustration of the body 160 according to FIG. 7 and the lid 162 according to FIG. 8 shows that each of these components may be manufactured as an injection molded article made of plastic with a low effort.

When the lid 162 is removed, as illustrated in FIG. 9, a user may directly grasp the stirrup-shaped hinge connection 164 in an anatomically simple and intuitive manner to commonly pivot the receiving devices 100 which are rigidly coupled to each other out of the receiving space 166 in an upright position.

Figure 10:
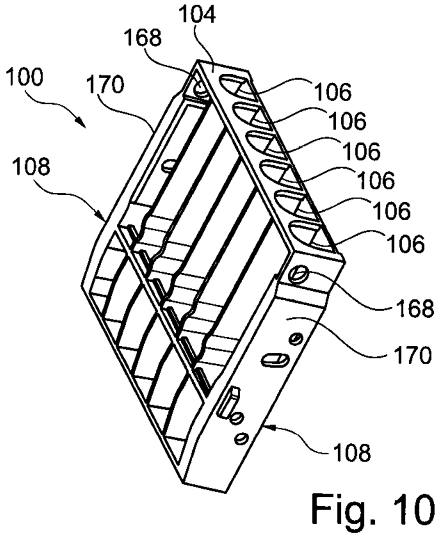
FIG. 10 shows a pivotable receiving device of the tool arrangement according to FIG. 4 to FIG. 9.

FIG. 10 separately shows the pivotable receiving device 100 of the tool arrangement 120 according to FIG. 5 to FIG. 9. In particular, FIG. 10 illustrates how, for pivotably coupling the receiving device 100 with the tool management device 140, at opposing sidewalls 170, coupling structures 108 are formed which are configured for cooperating with further coupling structures 109 which are illustrated in FIG. 7 at an inner side of the sidewalls 186 of the body 160 of the tool management device 140. At the hinge connection recesses 168 at both opposing sidewalls 170 of the receiving device 100 according to FIG. 10, the hinge connection 164 may be suspended. Further structures at the side surfaces 170 according to FIG. 10 may be utilized for rigidly coupling the receiving device 100 with other receiving devices 100, compare FIG. 4 and FIG. 6, for example.

FIG. 11 to FIG. 14 show three-dimensional views of a tool arrangement 120 according to another exemplary embodiment of the invention when the lid 162 is opened. FIG. 11A shows a detail of the tool arrangement 120 according to FIG. 11 to FIG. 14 in a first mounting position with pins 131 in a respective guiding channel 135 of a respective slide guide 133 which is cooperating with it. FIG. 11B shows another detail of the tool arrangement 120 according to FIG. 11 to FIG. 14 with components of a locking mechanism 176. FIG. 11C shows a further detail of the tool arrangement 120 according to FIG. 11 to FIG. 14 in a second mounting position which is different from the first mounting position, in which second mounting position the pins 131 are latched in assigned latching units 137 at the slide guides 133.

In the following, it is referred to the previous description of the figures, and the embodiment of FIG. 11 to FIG. 14 and FIG. 11A to FIG. 11C is described by means of its substantial differences with respect to the previously described embodiments.

Figure 11:
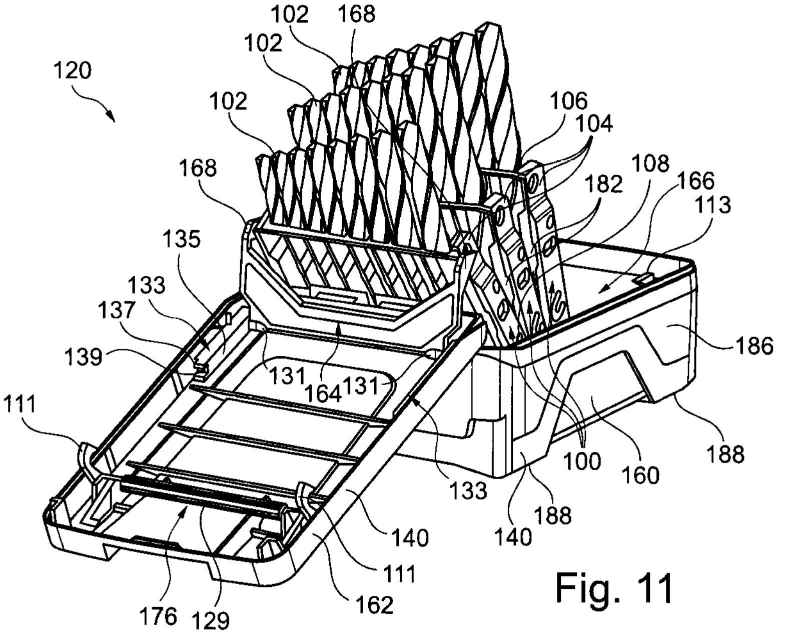
FIG. 11 shows a three-dimensional view of a tool arrangement according to another exemplary embodiment of the invention when the lid is opened.
Figure 11A:
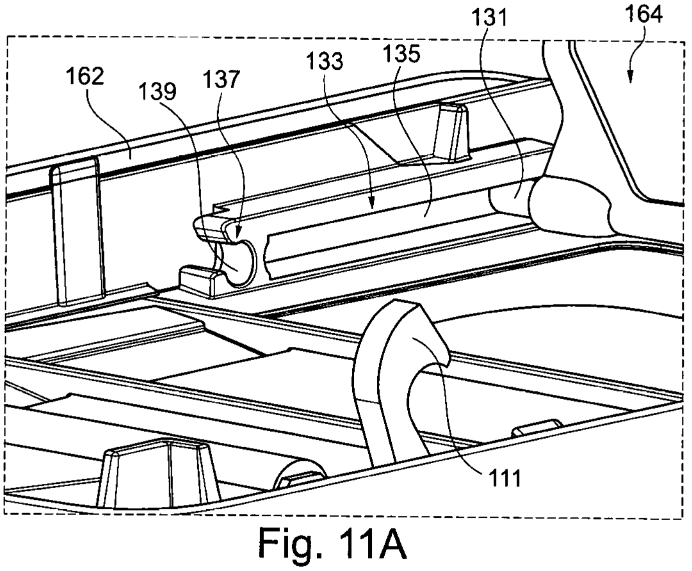
FIG. 11A shows a detail of the tool arrangement according to FIG. 11 to FIG. 14 with a pin in a guiding channel of a cooperating slide guide.
Figure 11B:
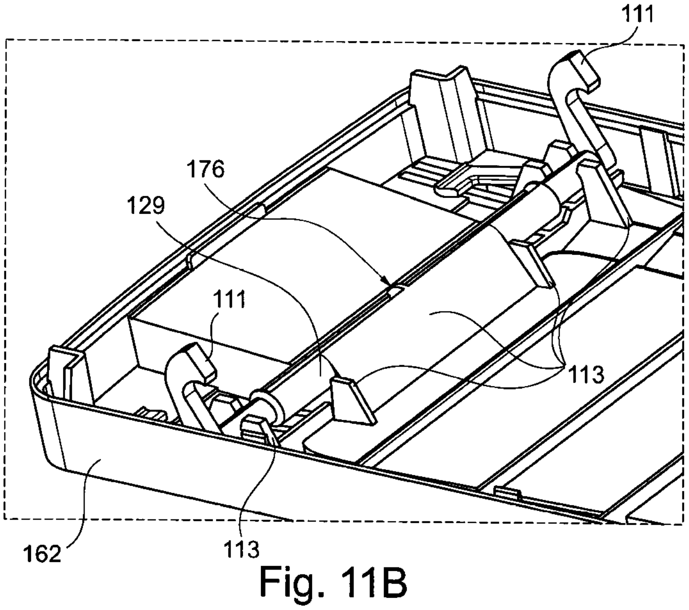
FIG. 11B shows another detail of the tool arrangement according to FIG. 11 to FIG. 14 with components of a locking mechanism.
Figure 11C:
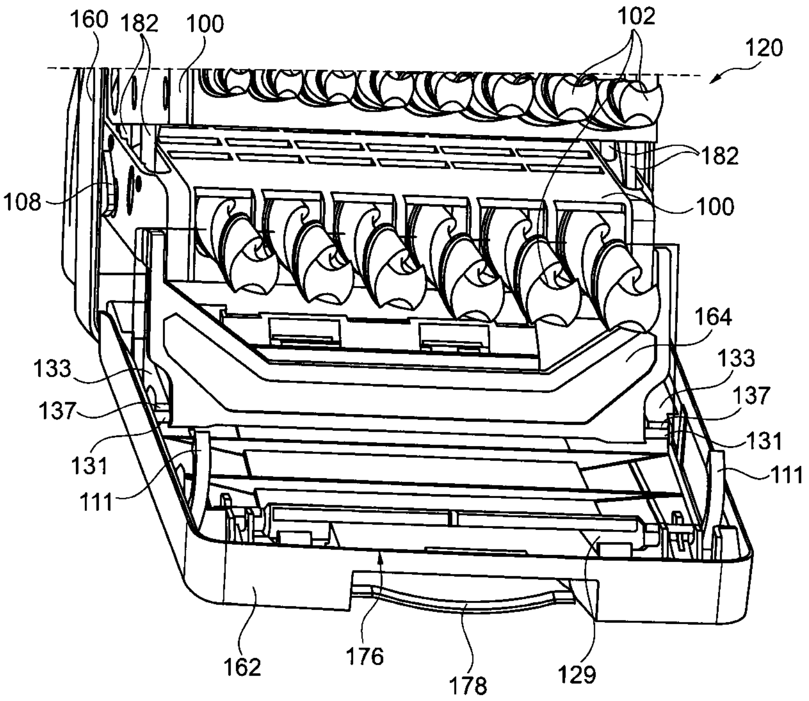
FIG. 11C shows a further detail of the tool arrangement according to FIG. 11 to FIG. 14 with a pin in a latching unit at a slide guide.
Figure 13:
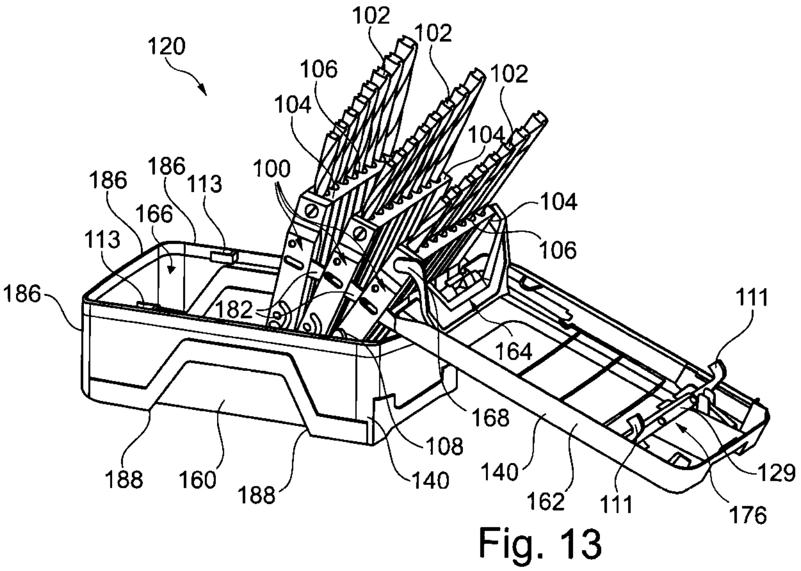
FIG. 13 shows another perspective three-dimensional view of a tool arrangement according to an embodiment of the invention when the lid is opened.
Figure 14:
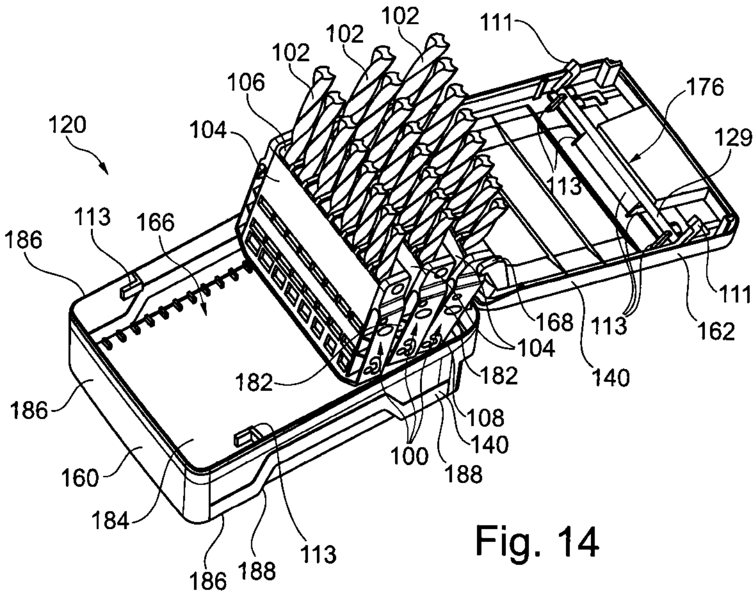
FIG. 14 shows another perspective three-dimensional view of a tool arrangement according to an embodiment of the invention when the lid is opened.

As can best be recognized in FIG. 11, FIG. 11A, and FIG. 11C, the hinge connection 164 may comprise a pair of opposing pins 131. Correspondingly to them, the lid 162 may comprise a pair of opposing slide guides 133 at two opposing sidewalls. Each of the slide guides 133 is configured for guiding the respectively assigned pin 131 along a pregiven or predefined trajectory. In other words, the hinge connection 164 comprises at two opposing sides the two pins 131 and the lid 162 comprises at two opposing sides the two slide guides 133. Each of the slide guides 133 is thus utilized for guiding an assigned one of the two pins 131 along a respective trajectory. This trajectory is defined by the geometry of the respective slide guide 133. In more detail, the respective trajectory is pregiven by a straight guiding channel 135 in the assigned slide guide 133. As can best be recognized in FIG. 11A, a guiding channel 135 of the respective slide guide 133 is configured, by mechanically guiding the respectively assigned pin 131 from a first end to an opposing second end of the mentioned guiding channel 135, to allow a pivoting of the lid 162 relatively to the body 160 around a certain angle. Depending on how far the pins 131 are displaced in the guiding channels 135, the opening angle between the lid 162 and the body 160 is larger or smaller. In the mounting position which is illustrated in FIG. 11 and FIG. 11A, the opening angle is approximately 180°, when the pins 131 are shifted up to a stopper at the end of a respectively assigned guiding channel 135 of the respective slide guide 133.

As can also best be recognized in FIG. 11, FIG. 11A, and FIG. 11C, at each of the slide guides 133, a respective latching unit 137 is formed, at which the respectively assigned pin 131—alternatively to its guiding in a guiding channel 135—is latchable. When the pins 131 are latched in the latching units 137, they are not freely displaceable in the guiding channel 135 of the assigned slide guide 133, but are stationary or anchored. When the pins 131 are latched in the latching units 137, a pivoting of the lid 162 relatively to the body 160 is only allowed around a smaller pivoting angle compared to the case when the pins 131 are guided in the guiding channels 135 of the slide guides 133. Said smaller pivoting angle is 90° in the illustrated embodiment and in the alternative mounting position according to FIG. 11C and FIG. 12, respectively. As shown, a respective one of the latching units 137, at an end side, is adjoining a respective assigned slide guide 133. As also illustrated, a respective receiving opening 139 of the latching units 137 is substantially C-shaped for receiving the respectively assigned pin 131.

Figure 12:
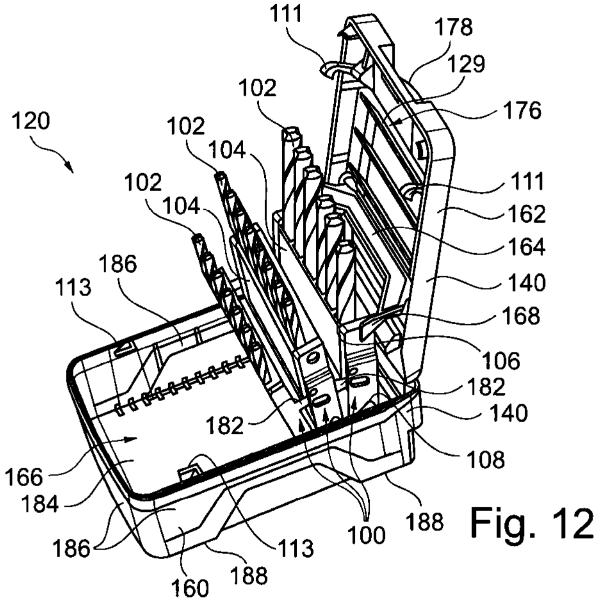
FIG. 12 shows another perspective three-dimensional view of a tool arrangement according to an embodiment of the invention when the lid is opened.

While FIG. 11 and FIG. 11A show the tool arrangement 120 with a pivoting angle between the body 160 and the lid 162 of approximately 180°, the pivoting angle between the body 160 and the lid 162 according to FIG. 12 and FIG. 11C is approximately 90°. In the mounting position according to FIG. 11, the pins 131 are located in the guiding channels 135, see FIG. 11A. In the mounting position according to FIG. 12, the pins 131 are located in the receiving opening 139 of the latching units 137, see FIG. 11C.

The hinge connection 164 may be made of such a resilient or deformable or elastic material, that the pins 131 of the hinge connection 164 may, changeably by a user, selectively be guided in the slide guide 133 or be latched in the latching units 137, therefore are re-mountable between the mentioned two mounting positions. In other words, due to the resilient material properties of the hinge connection 164, a user may freely transfer the tool arrangement 120 between the operational modes according to FIG. 11 and FIG. 12.

The pins 131 are molded to the stirrup-shaped or shield-type hinge connection 164 and are received and guided in the assigned slide guides 133 according to FIG. 11 and FIG. 11A, whereby the lid 162 is pivotable with respect to the body 160 around approximately 180°. Alternatively, the pins 131 may also be latched in the U-shaped and C-shaped, respectively, latching unit 137, adjoining an end of the slide guides 133. In this case, the lid 162 is pivoted with respect to the body 160 only around approximately 90°, compare FIG. 12 and FIG. 11C. The hinge connection 164 may be configured so softly, that a user may re-plug it between both positions according to FIG. 11 and FIG. 12.

Best recognized in FIG. 11 and FIG. 11B is an actuation unit 178 of a locking mechanism 176 at the lid 162. Said locking mechanism 176 encompasses a shaft 129 with two latching hooks 111 which are opposing each other at an end side, which shaft is mounted to an inner surface of the lid 162. Each latching hook 111 is shaped and positioned for rotatably engaging in one of two nose-shaped latching recesses 113 which are opposingly attached to the body 160. Advantageously, the shaft 129 may directly abut an inner wall of the lid 162. Preferably, the shaft 129 may be embedded in an inner wall of the lid 162, namely especially advantageously adjoining slants 113. The shaft 129 may be embedded in the lid 162. Descriptively, elements of the locking mechanism 176 are arranged at a position directly at a deep-drawn region of the locking mechanism 176. Therefore, screws and other small parts which are located in the tool arrangement 120 are prevented to block between the shaft 129 and the latching hooks 111, respectively. Also, the lower slants 113 contribute to this safety mechanism.

It should be noted that "comprising" does not exclude other elements or steps and the article "a" or "an" does not exclude a plurality. Furthermore, it is noted that features or steps, which are described with reference to one of the above embodiments, can also be used in combination with other features or steps of other examples described above.

The invention claimed is:

1. A tool arrangement, comprising:

a tool management device with a body and a lid, wherein the lid, with a hinge connection configured as a C-shaped stirrup, is configured pivotably relative to the body for selectively covering or releasing a receiving space of the body; and a receiving device for receiving tool elements which are mounted or mountable in the receiving space of the body such that by the C-shaped stirrup the receiving device is co-pivoted when the lid is pivoted;

wherein the lid is configured detachably from the C-shaped stirrup such that, after detaching the lid from the C-shaped stirrup, the receiving device is pivotable by actuating the C-shaped stirrup without the lid;

wherein the C-shaped stirrup is configured to be pivotably and detachably attached to the receiving device by respective connections at two opposing recesses at opposing sidewalls of the receiving device; and wherein two opposing legs of the C-shaped stirrup, engage the two opposing sidewalls of the receiving device at an outer side, and a connection portion of the C-shaped stirrup, which connects the legs, engages at an inner side of the lid.

2. The tool arrangement according to claim 1, further comprising at least one of the following features:

wherein the receiving device is mounted or mountable in the receiving space such that by the C-shaped stirrup the receiving device is pivoted out of the receiving space to an upright position when the lid is pivoted for releasing the receiving space;

wherein the receiving device is mounted or mountable in the receiving space such that by the C-shaped stirrup, the receiving device is pivoted into the receiving space in a lying position when the lid is pivoted for covering the receiving space;

wherein the receiving device is mounted or mountable in the receiving space such that, when the lid is detached, the receiving device is pivotable by muscle strength of a user from a lying position to an upright position in a force-free state using the C-shaped stirrup, and automatically pivots back in the lying state when the muscle strength is discontinued.

3. The tool arrangement according to claim 1, wherein the C-shaped stirrup is configured to remain attached to the receiving device when the lid is detached.

4. The tool arrangement according to claim 1, further comprising:

a locking mechanism which is attached partially at the lid and partially at the body, which is configured for locking the lid at the body when the receiving space of the body is covered by the lid;

wherein the locking mechanism comprises an actuation unit for actuating the locking mechanism by a user at an outer surface of the lid.

5. The tool arrangement according to claim 1, further comprising:

a further hinge connection at a pivoting axis between the body and the lid, wherein the further hinge connection is configured for pivoting the lid relative to the body.

6. The tool arrangement according to claim 1, wherein the receiving device comprises:

a block-shaped base body;

at least one tool element recess which is formed at the base body for user-definedly receiving at least one tool element; and coupling structures which are formed at the base body, for coupling the receiving device with the tool management device.

7. The tool arrangement according to claim 6, further comprising at least one of the following features:

wherein the coupling structures are arranged at two opposing side surfaces of the base body;

wherein the coupling structures are selectively configured for coupling the receiving device with the tool management device and for decoupling the receiving device from the tool management device;

wherein a serial arrangement of multiple tool element recesses is formed at the base body;

wherein the at least one tool element recess is configured for receiving at least one drill, in a circular inner profile;

at least one drill which is receivable or received in the at least one tool element recess.

8. The tool arrangement according to claim 1, wherein the receiving device is configured integrally.

9. The tool arrangement according to claim 1, further comprising:

at least one further receiving device for receiving tool elements, which is mounted or mountable at the receiving device by angle pieces at opposing sides of the receiving device.

10. The tool arrangement according to claim 9, further comprising at least one of the following features:

wherein the at least one further receiving device is mounted at a side of the receiving device which is facing away from the lid without a hinge;

wherein the receiving device comprises first tool elements and the further receiving device comprises second tool elements and wherein the first tool elements have a larger length than the second tool elements;

wherein the at least one further receiving device comprises:

a block-shaped base body;

at least one tool element recess which is formed at the base body, for user-definedly receiving at least one tool element; and coupling structures which are formed at the base body for coupling the at least one further receiving device to the receiving device.

11. The tool arrangement according to claim 1, further comprising at least one of the following features:

wherein the body comprises a bottom and four sidewalls;

wherein the lid is configured detachably from the body;

wherein the tool management device is configured such that, when pivoting the lid relative to the body around a predetermined angle, the lid is transferable in a latching position which preferably prevents a further pivoting, in which latching position the receiving device, by the C-shaped stirrup, is transferred to an access position for accessing at least one tool element at the receiving device by a user in an at least partially upright position.

12. The tool arrangement according to claim 1, wherein the tool management device is configured to be form-lockingly stackable with a similar or identical tool management device;

comprising at least one of the following features:

wherein, for stacking, a bottom of the body comprises feet at an outer side, for engaging in and/or around a corresponding profile at an outer side of the lid;

wherein, for stacking, a bottom of the body comprises an at least partially surrounding bar at an inner side, for engaging in an at least partially surrounding indentation in an inner region of the lid.

13. The tool arrangement according to claim 1, wherein the C shaped stirrup comprises at least one pin and the lid comprises at least one slide guide for guiding the at least one pin along a predetermined trajectory.

14. The tool arrangement according to claim 13, further comprising at least one of the following features:

wherein the predetermined trajectory is defined by a guiding channel in the at least one slide guide;

wherein, at the at least one slide guide, at least one latching unit is formed, to which the at least one pin is latchable alternatively to guiding in the at least one slide guide;

wherein the C shaped stirrup is configured deformably, such that the at least one pin of the C-shaped stirrup is changeably re-mountable by a user between the slide guide and at least one latching unit at the slide guide.

15. A method of managing tool elements by a tool arrangement, the method comprising:

mounting a lid to a body with a hinge connection being a C-shaped stirrup and subsequently selectively covering or releasing a receiving space of the body by pivoting the lid, whereby a receiving device is co-pivoted by the C-shaped stirrup; and/or detaching the lid from the body and the C-shaped stirrup and subsequently pivoting the receiving device by actuating the C-shaped stirrup without the lid;

wherein the C-shaped stirrup is configured to be pivotably and detachably attached to the receiving device by respective connections at two opposing recesses at opposing sidewalls of the receiving device; and wherein two opposing legs of the C-shaped stirrup, engage the two opposing sidewalls of the receiving device at an outer side, and a connection portion of the C shaped stirrup which connects the legs, engages at an inner side of the lid.

16. The method according to claim 15, wherein the method, after detaching the lid, further comprises:

accommodating the body and the receiving device which is mounted to it under constricted space conditions in a drawer or in a case;

wherein the method, subsequently to accommodating, comprises;

pivoting the receiving device and removing a tool element from the receiving device without removing the body and the receiving device which is mounted to it from the constricted space conditions from the drawer or the case.

17. The method according to claim 15, further comprising at least one of the following features:

wherein the method, subsequently to detaching the lid, comprises manually actuating the C-shaped stirrup by a user;

user-definedly receiving at least one tool element at at least one tool element recess which is formed at the receiving device;

coupling the receiving device with the tool management device by forming an operative connection between coupling structures which are formed at the receiving device and further coupling structures of the tool management device;

equipping and/or re-equipping the receiving device by a user with a set of user-defined tool elements which is selected from a larger reservoir of tool elements by a user;

equipping and/or re-equipping the tool management device by a user with a set of user-defined receiving devices which is selected from a larger reservoir of receiving devices by a user.

* * * * *